US008990703B2

(12) United States Patent
Nhiayi

(10) Patent No.: US 8,990,703 B2
(45) Date of Patent: Mar. 24, 2015

(54) SMART-REMOTE PROTOCOL

(75) Inventor: Kao Nhiayi, San Diego, CA (US)

(73) Assignee: Sony Corporation, Tokyo (JP)

(*) Notice: Subject to any disclaimer, the term of this patent is extended or adjusted under 35 U.S.C. 154(b) by 1088 days.

(21) Appl. No.: 13/018,665

(22) Filed: Feb. 1, 2011

(65) Prior Publication Data

US 2012/0198350 A1 Aug. 2, 2012

(51) Int. Cl.
*G06F 3/048* (2013.01)
*H04N 5/50* (2006.01)
*H04N 21/482* (2011.01)
*H04N 21/422* (2011.01)
*G06F 9/44* (2006.01)
*G06F 3/0482* (2013.01)
*H04N 21/443* (2011.01)
*H04N 21/472* (2011.01)

(52) U.S. Cl.
CPC .......... *H04N 21/4222* (2013.01); *G06F 9/4445* (2013.01); *G06F 3/0482* (2013.01); *G08C 2201/30* (2013.01); *G08C 2201/20* (2013.01); *H04N 21/4438* (2013.01); *H04N 21/472* (2013.01)
USPC .............. 715/740; 348/734; 348/570; 725/38

(58) Field of Classification Search
CPC ....................................................... G06F 3/048
USPC .......... 715/740, 771, 255; 345/156, 169, 570; 348/14, 734; 455/419, 420; 725/38
See application file for complete search history.

(56) References Cited

U.S. PATENT DOCUMENTS

| 6,417,870 | B1* | 7/2002 | Brackett et al. ................ 715/771 |
| 6,466,971 | B1 | 10/2002 | Humpleman et al. |
| 6,947,156 | B1 | 9/2005 | Jeyachandran et al. |
| 7,548,748 | B2* | 6/2009 | Dunko et al. .................. 455/419 |
| 7,634,263 | B2* | 12/2009 | Louch et al. ................... 455/420 |
| 7,715,375 | B2* | 5/2010 | Kubler et al. .................. 370/353 |
| 7,814,510 | B1* | 10/2010 | Ergen et al. ...................... 725/38 |
| 8,054,211 | B2* | 11/2011 | Vidal ............................. 341/176 |

(Continued)

FOREIGN PATENT DOCUMENTS

CN 1280341 A 1/2001
CN 101102322 A 1/2008

OTHER PUBLICATIONS

Chinese Office Action for Chinese Application 201210020794.9, Jun. 17, 2014.

*Primary Examiner* — Jennifer To
*Assistant Examiner* — Qi Wan
(74) *Attorney, Agent, or Firm* — Miller Patent Services; Jerry A. Miller

(57) ABSTRACT

A remote menu control function mapping set including user interface control commands that control operation of a second device is obtained at a first device from the second device. The user interface control commands are encoded using a shared cross-communication library that defines a user interface sharing protocol. A menu that maps the encoded user interface control commands to menu items using the shared cross-communication library is generated. The generated menu is displayed on a display of the first device. A selection of a menu item from the displayed menu is detected. An encoded user interface control command that is mapped to the selected menu item is sent to the second device. This abstract is not to be considered limiting, since other embodiments may deviate from the features described in this abstract.

18 Claims, 5 Drawing Sheets

(56) References Cited

U.S. PATENT DOCUMENTS

| | | | |
|---|---|---|---|
| 8,054,294 B2 * | 11/2011 | Sakai et al. | 345/169 |
| 8,106,742 B2 * | 1/2012 | Marshall et al. | 340/4.3 |
| 2006/0066716 A1 * | 3/2006 | Chang | 348/14.05 |
| 2007/0229465 A1 * | 10/2007 | Sakai et al. | 345/173 |
| 2007/0257982 A1 * | 11/2007 | Luo et al. | 348/14.05 |
| 2008/0005353 A1 | 1/2008 | Panabaker et al. | |
| 2008/0009334 A1 | 1/2008 | Walker et al. | |
| 2008/0120538 A1 * | 5/2008 | Kurz et al. | 715/255 |
| 2009/0138910 A1 * | 5/2009 | Jin et al. | 725/38 |
| 2010/0027467 A1 * | 2/2010 | Wu et al. | 370/328 |
| 2010/0245241 A1 * | 9/2010 | Kim et al. | 345/156 |
| 2010/0275135 A1 * | 10/2010 | Dunton et al. | 715/753 |
| 2012/0026400 A1 * | 2/2012 | Kang et al. | 348/570 |
| 2012/0133841 A1 * | 5/2012 | Vanderhoff et al. | 348/734 |
| 2013/0013318 A1 * | 1/2013 | Huang et al. | 704/275 |

* cited by examiner

SMART-REMOTE PROTOCOL

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Electronic devices, such as computers, televisions, and mobile phones, have user interfaces that allow a user to interact with the devices. User interfaces allow for inputs from users in the form of information and item selection. User interfaces also allow for output of information to the users.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
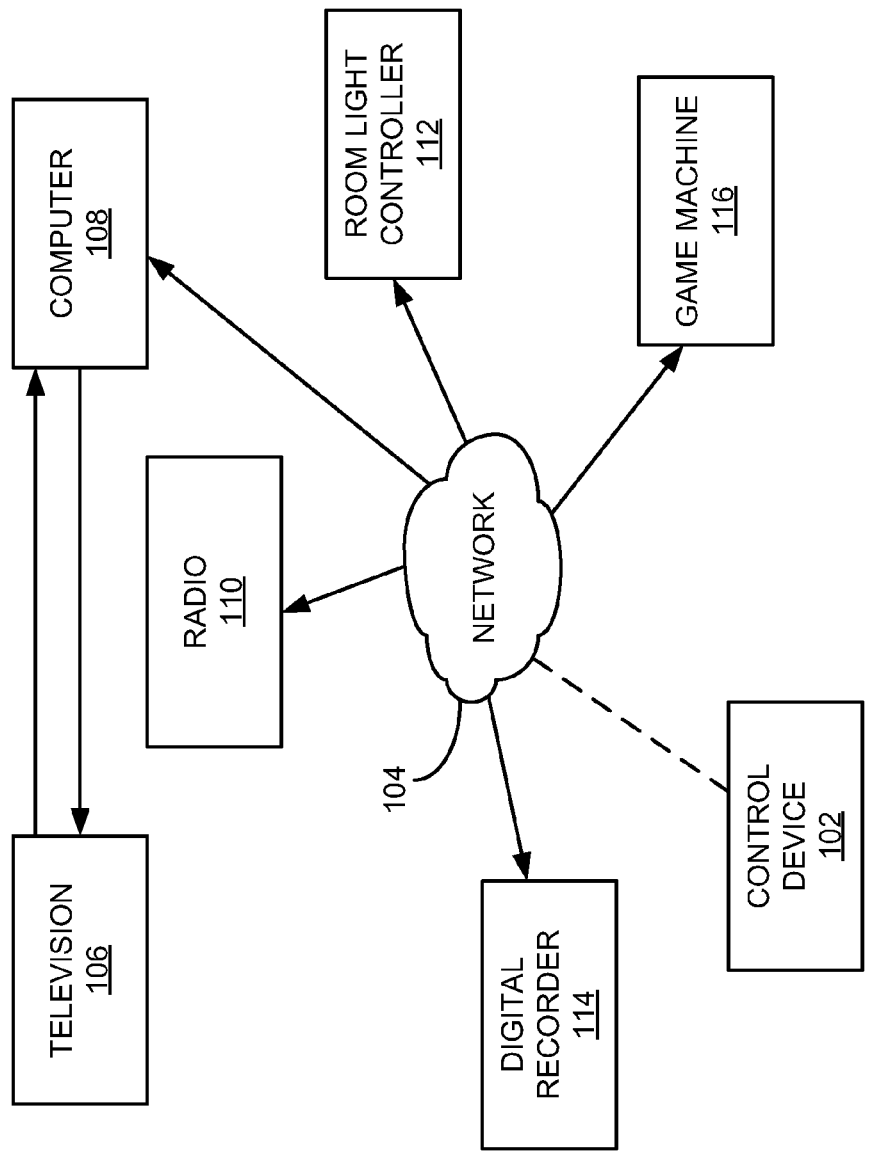
FIG. 1 is a block diagram of an example of an implementation of a system for utilizing the smart-remote protocol consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system having one or more processors.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," "an embodiment," "an implementation," "an example" or similar terms means that a particular feature, structure, or characteristic described in connection with the example is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The present subject matter provides a smart-remote protocol. The smart-remote protocol described herein is a unified user interface communication protocol that allows different devices with potentially different user interfaces to cross-control one another, with each device having a capability to act as either a client or a server for a particular interaction. The smart-remote protocol provides for freedom of user interface design for different devices while implementing cross-control capabilities. The smart-remote protocol improves cross-device interaction and control capabilities by implementing a shared cross-communication library that defines a user interface sharing protocol. This shared cross-communication library and user interface sharing protocol may be updated and downloaded to devices as appropriate for a given implementation to allow devices to share control functionality with other devices without requiring a standardized user interface on each of the respective devices. As such, each smart-remote control device may fully control and be fully controlled by any other device having the same shared cross-communication library. Accordingly, each smart-remote control device may operate as either a client or a server device for a particular interaction, and these roles may change to provide a user with flexibility of device control.

Devices may interact and share user interface control function mappings that include user interface control commands encoded using the shared cross-communication library. The shared cross-communication library defines the user interface sharing protocol referred to alternatively herein as the smart-remote protocol. Any device that implements the smart-remote protocol may request and obtain the control function mappings of another device. For purposes of the present description, a device that controls another device for an interaction may be referred to as either a "control" device or a "client" device. Conversely, a device that is controlled for an interaction may be referred to as a "controlled" device or a "server" device. These roles may change for each functional interaction between two or more devices.

The control device may determine a menu tree for the menu and capacities (e.g., capabilities) of the controlled/server device from the obtained control function mappings. Each capacity may have an associated capacity/function identifier (ID) and a value or range of values that may be set for the respective control functions. The function ID may be matched to user interface keys or selections of the server device such that the correct function is activated in response to sending a particular function ID and value to a given server device.

The server device may also provide a list of key navigation commands (e.g., functions) that would allow the server device to be controlled for principle or primary functionality. The list of key navigation commands may include a primary functional sub-set of encoded user interface control commands that allow primary controls for controlling a device (e.g., on, off, up, down, left, right, etc.). As such, the smart-remote protocol allows emulation of remote control features for controlling such devices.

The server device may also provide additional information about the layout (e.g., look and feel) for its menu and user interface. This additional information may be communicated as metadata in association with the control function mapping. Additional metadata may include, for example, model information metadata, vendor/manufacturer metadata, and other metadata as appropriate for a given implementation. The control device may determine whether to use the provided layout (e.g., based upon available resources such as memory, screen display space, output capabilities, etc.) or to use its own menu and user interface layout. A generic layout may be provided where resources are limited.

If the control device is unable to display the menu, it may request a virtual remote control interface from the server device. The virtual remote control interface may include a mapping of the current remote control codes shipped with the server device as part of its factory programming The control device may also request an extended remote control interface that may include one or more shortcut key options.

The control device may analyze the received control function mapping(s) and determine whether to use the menu tree as provided by the server device or whether to change the organization of one or more menu items. The control device may further analyze the received control function mapping and determine whether to utilize all received command options or whether to remove/discard one or more command options. The control device may also create shortcut keys/options that are not available within the server-provided control function mapping(s). Further, the control device may implement a different menu, each with a different look and feel, for each controlled (e.g., server) device. Many other possibilities exist for modification of received control function mappings and all are considered within the scope of the present subject matter.

The control device may generate a menu that maps the encoded user interface control commands to menu items using the cross-communication library. The generated menu may be stored for reuse and displayed, and user selections of control functions for the respective server device may be detected and sent to the server device for processing. The generated menu may also be edited and the edits may be saved for reuse.

As described above, by using the smart-remote protocol, devices with the same or with different user interface designs may cross-control each other. As such, either device may concurrently operate as a client of a device operating as a server for a particular interaction, and may operate as a server to the same device or a different device operating as a client for a particular interaction.

For example, a user of a smart-remote protocol device may come home, check their networkable cellular telephone, turn off a radio that was playing for a pet during the day, turn on a television, set a recording on a digital recorder, and turn on or off one or more lights (where the lights are controlled by a network server device)—all from a single control device. Alternatively, a cellular telephone may be used, for example, to control a vehicle radio. Additionally, a single device may be configured to concurrently broadcast and control multiple devices, such as changing a channel or an audio/video content source for multiple television sets within a retail environment. The controlled devices may be from the same or different manufacturers. Control operations may be performed by referencing the name of the action with a function ID that may be processed by the controlled device. Each controlled device may be controlled, for example, with a cellular telephone. Many other possibilities exist for smart-remote protocol implementation and all are considered within the scope of the present subject matter.

Further regarding control of multiple devices, each of these devices may be from different manufacturers and have different user interfaces, and still operate for cross-control using the smart-remote protocol. The control device for any particular interaction may render a common user interface or individual user interfaces for each device configured for control by the control device. Accordingly, the smart-remote protocol described herein may be used for cross-control of devices across different brands/manufacturers and device specific implementations and/or limitations.

Any device selected by a user as a control device for a particular interaction may be configured to broadcast a device discovery request via a communication protocol available on the selected device. At least one device accessible via the communication protocol available on the selected device may be discovered via the broadcast discovery processing. A user may be prompted to select from which of the discovered devices to obtain control function mappings for a given interaction and control function mappings may be received from each selected discovered device. Alternatively, the control device may obtain control function mappings from each discovered device in an automated manner and provide control options for control of each discovered device to the user. The control device may send a "probe" command to each discovered device and receive the control function mapping from each device in response to the probe command. The control device may generate and display either a combined menu or individual menus in response to receipt of the control function mapping(s).

Control function mappings may also be obtained across communication protocol boundaries. For example, a device with both network (e.g., Ethernet) and Bluetooth® capacity may be controlled by a Bluetooth® cellular telephone. The cellular telephone, operating as the control device, may support the communication protocol for controlling the other device. In this case, the server device supports both Ethernet and Bluetooth®. The cellular telephone may then connect to the server device and download control function mappings. The control function mappings may include a menu map and software remote key map. Since the cellular telephone may be limited in processing power and/or on-board resources, the software running on the cellular telephone may use core functionalities within a user interface for controlling the server device or may provide enhanced functionalities, such as described above for creation of shortcut keys/options that are not available within the server-provided control function mapping(s).

Alternatively, if the communication between devices is not directly compatible, communication protocol chaining may be used to chain control of other devices utilizing protocol conversion capabilities of an intermediate device. For example, a cellular telephone may include communication capabilities for Bluetooth®, global system for mobile communications (GSM®), third-generation (3G) cell-phone technology, and wireless fidelity (WiFi). A personal computer (PC) may include communication capabilities for Bluetooth®, WiFi, and Ethernet. A television (TV) may include communication capabilities for Ethernet. In such an implementation, a cellular telephone, operating as the control device, may connect to the PC via either Bluetooth® or WiFi, use a menu defined by the software running on the PC, and use the shared cross-communication library to control the TV. As such, the cellular telephone may control the TV through the PC (e.g., by cellular telephone (WiFi) to the PC (Ethernet) to the TV). Other examples of devices that may be cross-controlled using the smart-remote protocol include, but are not limited to, disc players, game machines, laptops, set top boxes (STBs), and car radios. Many additional possibilities exist for cross-control of devices using the smart-remote protocol described herein and all are considered within the scope of the present subject matter.

The following pseudo sequence listing illustrates one possible example of library usage:

```
client [ -> lib(client mode) -> abstract communication ] -> probe server
server [ lib [server mode) -> abstract communication ] -> broadcast
service ID
client -> found server -> request server Menu
server -> send the menu structure
```

The pseudo sequence listing example of library usage above shows in the first line that a control device sends a "probe" command to discover potential server devices. The second line shows action by the server device to broadcast a service identifier (ID). The third line shows action by the control device to request a menu from the discovered server device. The fourth line shows action by the discovered server device to send a control menu structure to the control device. For purposes of the present example, the control menu structure may be represented as an extensible markup language (XML) file.

The following first pseudo XML listing of a control menu structure provides one example of a control function mapping for menu options available at a server device.

```
<server ID="ServerIdentifier">
<Model/>
</Model>
<vendor/>
</vendor>
<category button="button ID0" name="Home">
    <category button="button ID1" name="picture">
        <category button="button ID2" name="contrast">
            <control controlCode="#01">
                <maxVal value="10"/>
                <minVal value="0"/>
                <currentVal value="5"/>@
```

-continued

```
            </control>
        </category>
    ...
    </category>
</server>
```

Within the pseudo XML listing above, the "server ID" tag represents an identifier of the server device that sent the control function mapping. The identifier itself referenced by the server ID tag may include a numeric, alpha, alphanumeric, or other identifier as appropriate for a given implementation. Tag field pairs "Model" and "vendor" may be utilized to communicate model and vendor information associated with the respective server device. A nested hierarchical set of "category" tags show one example of a control function mapping. As can be seen from the pseudo XML listing above, several menu buttons are defined hierarchically. Each button has an associated name. A control code represented by a "control" tag pair includes a control code identifier "controlCode" with a numeric control identifier, and a range of selectable values (e.g., maxVal and minVal) are provided along with a current value setting (e.g., currentVal).

As such, server devices may be discovered by a control device using a discovery command. The control device may request a menu from one or more server device. Each server device may send a control function mapping that includes a server ID, menu selections, and a range of selectable values and a current value for each setting. Many other possibilities exist for communication of menu control function information and all are considered within the scope of the present subject matter.

The following second pseudo XML listing of an alternative control menu structure provides another example of a control function mapping for menu options available at a server device, such as a television.

```
<server ID="ServerIdentifier">
<Model/>
    TVXXXXX
</Model>
<vendor/>
    VENDORXXXX
</vendor>
<category button="button ID0" name="Home">
    <description>
        Press home button to access the menu of your TV.
    </description>
    <category button="button ID1" name="picture">
        <category button="button ID1-1" name="contrast">
            <control controlCode="#01" type="Slider">
                <maxVal value="10"/>
                <minVal value="0"/>
                <currentVal value="5"/>
            </control>
        </category>
        <category button="button ID1-2" name="120Hz">
            <control controlCode="#02" type="booleanBox">
                <currentVal value="on"/>
            </control>
        </category>
        <category button="button ID1-3" name="sceneType">
            <control controlCode="#03" type="selection">
                <select value="movie"/>
                <select value="photo"/>
                <select value="sport"/>
                <select value="PC"/>
                <currentVal value="movie"/>
            </control>
        </category>
    </category>
```

-continued

```
        <category button="button ID2" name="sound">
            <category button="button ID2-1" name="trebble">
                <control controlCode="#04" type="Slider">
                    <maxVal value="20"/>
                    <minVal value="0"/>
                    <currentVal value="11"/>
                </control>
            </category>
            <category button="button ID2-1" name="bass">
                <control controlCode="#04" type="Slider">
                    <maxVal value="20"/>
                    <minVal value="0"/>
                    <currentVal value="13"/>
                </control>
            </category>
            <category button="button ID2-1" name="volume">
                <control controlCode="#04" type="Slider">
                    <maxVal value="20"/>
                    <minVal value="0"/>
                    <currentVal value="10"/>
                </control>
            </category>
            <category button="button ID2-1" name="mute">
                <control controlCode="#04" type=" booleanBox">
                    <currentVal value="off"/>
                </control>
            </category>
        </category>
    ...
    </category>
</server>
```

Within the second pseudo XML listing above, a generic label has been added for each of a model identifier and a vendor identifier. A description field has been entered. This description field may be displayed to a user via a display. Button identifiers (e.g., "button ID1-1," "button ID1-2," etc.) and control function names (e.g., "contrast," "120 Hz," "sceneType," etc.) are illustrated. Control codes (e.g., "#01," "#02, " etc.) and style identifiers (e.g., "Slider," "booleanBox," etc.) are also shown. It should be noted that the control codes represent one possible example of encoding of a remote menu control function mapping set of user interface control commands that control operation of a device from which the second pseudo XML listing of a command interface was received. Control codes are unique to differentiate each respective control action sent to a server device. Further, as described above, the second pseudo XML listing provides an example of user interface control commands that are encoded via a shared cross-communication library that defines a user interface sharing protocol. Maximum and minimum values define a range of selectable values for the respective control codes. Current values represent current settings of the respective control elements.

As with the first pseudo code listing above, server devices may be discovered by a control device using a discovery command. The control device may request a menu from one or more server device. Each server device may send a control function mapping that includes a server ID, menu selections, and a range of selectable values and a current value for each setting. Many other possibilities exist for communication of menu control function information and all are considered within the scope of the present subject matter.

The following third pseudo XML listing of an alternative control menu structure provides another example of a control function mapping for menu options available at a server device, such as a high fidelity (Hi-Fi) audio system.

```
<server ID="ServerIdentifier">
<Model/>
    HIFIXXXX
</Model>
<vendor/>
    VENDORXXXX
</vendor>
<category button="button ID0" name="Home">
    <description>
        Press home button to access the menu of your sound system
        device.
    </description>
    <category button="button ID1" name="CD">
        <category button="button ID1-1" name="play" icon="@dress">
            <!-- address may be the local IP address of the server that
                stores the icon -->
            <control controlCode="#01" type="button">
            </control>
        </category>
        <category button="button ID1-1" name="stop"
        icon="@dress">
            <control controlCode="#02" type=" button">
            </control>
        </category>
        <category button="button ID1-3" name="pause"
        icon="@dress">>
            <control controlCode="#03" type="button">
            </control>
        </category>
    </category>
    <category button="button ID2" name="sound">
        <category button="button ID2-1" name="trebble">
            <control controlCode="#04" type="Slider">
                <maxVal value="20"/>
                <minVal value="0"/>
                <currentVal value="11"/>
            </control>
        </category>
        <category button="button ID2-1" name="bass">
            <control controlCode="#04" type="Slider">
                <maxVal value="20"/>
                <minVal value="0"/>
                <currentVal value="13"/>
            </control>
        </category>
        <category button="button ID2-1" name="volume">
            <control controlCode="#04" type="Slider">
                <maxVal value="20"/>
                <minVal value="0"/>
                <currentVal value="10"/>
            </control>
        </category>
        <category button="button ID2-1" name="mute">
            <control controlCode="#04" type=" booleanBox">
                <currentVal value="off"/>
            </control>
        </category>
    </category>
...
</category>
</server>
```

The third pseudo XML listing above provides an alternative example of a type definition for a shared cross-communication library. The type definition provides a processing order to a client application for selection of possible menu items using a hypertext markup language (HTML) form. Tags may be extended. For example, the "description" tag may be expanded to allow feedback to a user that a menu for the respective server device is prepared for display. Additionally, it should be noted that, for purposes of the present example, the "@dress" symbols within the third pseudo XML listing above represent an address pointer to an Internet protocol (IP) address of a server that stores the icon(s). Other possibilities exist for modification of the pseudo listings above and all are considered within the scope of the present subject matter.

It should also be noted that, as described above, if a client device connects to two server devices to control a feature of both devices (e.g., a mute control), that client device will connect to both server devices, get their addresses and control function mappings, and send each server device the corresponding control code from its respective control function mapping with the correct value, where a value is associated with a given command.

For example, a client device may discover a television and a Hi-Fi audio system at Internet protocol (IP) addresses:
192.168.1.101 and
192.168.1.105

Using the subject matter described herein, user input may be detected for creation of a "master mute" macro/shortcut that sends a respective mute command to each discovered device. In response to detection of a user triggering the "master mute" macro via the client device, the client device may send a request to each device. One possible example of such a command for each respective device is shown below using the IP addresses listed above:
http://192.168.1.101/control?code=#03&value=mute
http://192.168.1.105/control?code=#07&value=mute It should be noted that each control code is represented within the example above with a different value (e.g., #03 and #07, respectively) to illustrate that each server device may include a different set of command function mappings based upon the respective menu system of each server device. Within the present example, the commands shown above trigger processing to execute a mute operation to turn off audio output from the server devices. Many other possibilities for control of server devices using the smart-remote protocol described herein are possible and all are considered within the scope of the present subject matter.

Turning now to FIG. 1, FIG. 1 is a block diagram of an example of an implementation of a system 100 for utilizing the smart-remote protocol described herein. A control device 102 interconnects via a network 104 with a variety of other devices, either directly or indirectly. These devices include a television (TV) 106, a computer 108, a radio 110, a room/light controller 112, a digital recorder 114, and a game machine 116. As will be described in more detail below, the control device 102 provides control functionality for each device represented within the system 100 using the smart-remote protocol described herein.

Additionally, the control device may include, for example a cellular telephone, a computer, or a remote control device for one of the other devices within the system 100. For purposes of the present example, it is assumed that the control device includes at least Bluetooth® and WiFi communication capabilities and that the network 104 represents one of Bluetooth® and WiFi interconnectivity between the devices shown connected via the network 104. The computer 108 includes communication capabilities for Bluetooth®, WiFi, and Ethernet. The TV 106 includes communication capabilities for Ethernet. Each of the radio 110, the room/light controller 112, the digital recorder 114, and the game machine 116 are assumed accessible via one of Bluetooth® and WiFi interconnectivity associated with the network 104.

As such, the control device 102 may interconnect indirectly via the network 104 and the computer 108 via either Bluetooth® or WiFi and use a menu defined by the software running on the computer 108, using the shared cross-communication library, to connect to and control the TV 106. Further, the control device 102 may interconnect directly to one of the radio 110, the room/light controller 112, the digital recorder 114, and the game machine 116 using the shared cross-communication library to connect to and control the respective device. It should further be noted that the radio 110 may include a portable or car radio as appropriate for a given implementation.

It should be understood that the communication and control functionality described herein may be performed in real time and/or near real time. For purposes of the present description, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 2:
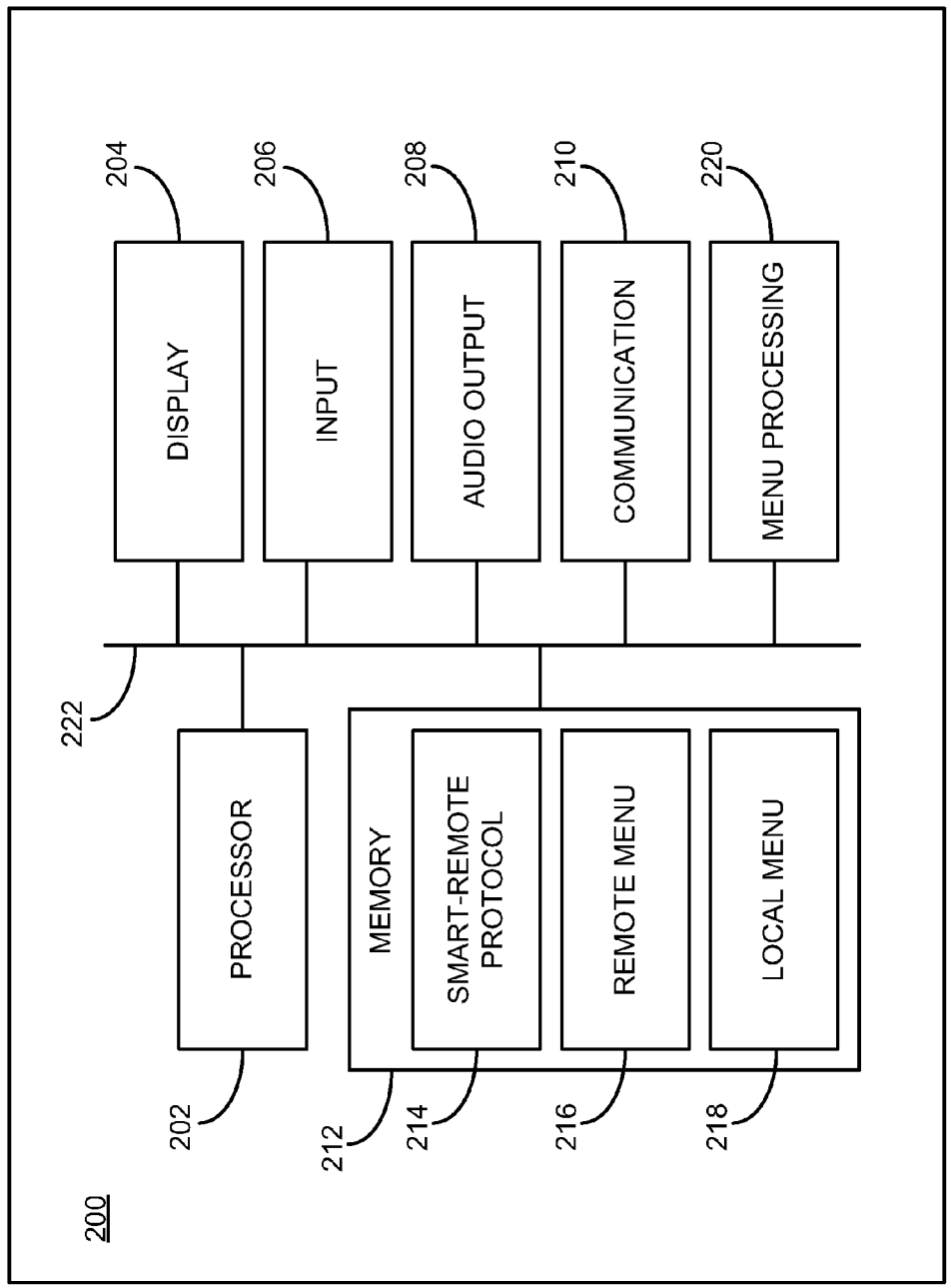
FIG. 2 is a block diagram of an example of an implementation of a core processing module that provides smart-remote protocol capabilities consistent with certain embodiments of the present invention.

FIG. 2 is a block diagram of an example of an implementation of a core processing module 200 that provides smart-remote protocol capabilities. It should be understood that the core processing module 200 may form a portion of each device described above in association with FIG. 1.

A processor 202 provides computer instruction execution, computation, and other capabilities within the core processing module 200. A display device 204 provides visual and/or other information to a user of the core processing module 200. The display device 204 may include any type of display device, such as a cathode ray tube (CRT), liquid crystal display (LCD), light emitting diode (LED), projection or other display element or panel. An input device 206 provides input capabilities for the user. The input device 206 may include a mouse, pen, trackball, or other input device. One or more input devices, such as the input device 206, may be used.

An audio output device 208 provides audio output capabilities for the core processing module 200, such as verbal prompts, associated with the processing described herein. The audio output device 208 may include a speaker, driver circuitry, and interface circuitry as appropriate for a given implementation.

A communication module 210 provides communication capabilities for interaction with the core processing module 200, such as for retrieval of control function mappings or other activities as appropriate for a given implementation. The communication module 210 may support wired or wireless standards appropriate for a given implementation. Example wired standards include Ethernet and an Internet video link (IVL) interconnection within a home network, for example, such as Sony Corporation's Bravia® Internet Video Link (BIVL™). Example wireless standards include cellular wireless communication, WiFi, and Bluetooth® wireless communication standards. Many other wired and wireless communication standards are possible and all are considered within the scope of the present subject matter.

It should be noted that the communication module 210 is illustrated as a component-level module for ease of illustration and description purposes. It is also understood that the communication module 210 may include any hardware, programmed processor(s), and memory used to carry out the functions of the communication module 210. For example, the communication module 210 may include additional controller circuitry in the form of application specific integrated circuits (ASICs), processors, antenna(s), and/or discrete integrated circuits and components for performing electrical control activities associated with the communication module 210. Additionally, the communication module 210 may include interrupt-level, stack-level, and application-level modules as appropriate. Furthermore, the communication module 210 may include any memory components used for storage, execution, and data processing by these modules for performing processing activities associated with the communication module 210. The communication module 210 may also form a portion of other circuitry described below without departure from the scope of the present subject matter.

A memory 212 includes a smart-remote protocol storage area 214 that stores a shared cross-communication library that defines a user interface sharing protocol and other information associated with smart-remote protocol processing. The memory 212 also includes a remote menu storage area 216 that stores control function mappings that include user interface control commands and metadata received from server devices. The memory 212 further includes a local menu storage area 218 that stores a primary menu interface for the respective device associated with the core processing module 200. The local menu storage area 218 also stores one or more generated menus for server devices that map the encoded user interface control commands for the respective server device(s) from the obtained control function mapping to menu items using the shared cross-communication library. As described above, a combined menu may be generated or multiple menus may be generated for control of the respective server devices. Additionally, the generated menus may be combined with the primary menu interface for the respective device associated with the core processing module 200 without departure from the scope of the present subject matter.

It is understood that the memory 212 may include any combination of volatile and non-volatile memory suitable for the intended purpose, distributed or localized as appropriate, and may include other memory segments not illustrated within the present example for ease of illustration purposes. For example, the memory 212 may include a code storage area, an operating system storage area, a code execution area, and a data area without departure from the scope of the present subject matter.

A menu processing module 220 is also illustrated. The menu processing module 220 provides processing capabilities for discovering server devices, requesting menu control function mapping, generating menu(s) for control of server devices using the shared cross-communication library, displaying and processing menu requests, and controlling server devices in response to detected selections from displayed generated menus, as described above and in more detail below. The menu processing module 220 implements the automated smart-remote protocol processing of the core processing module 200.

Though the menu processing module 220 is illustrated as a component-level module for ease of illustration and description purposes, it should be noted that the menu processing module 220 may include any hardware, programmed processor(s), and memory used to carry out the functions of this module as described above and in more detail below. For example, the menu processing module 220 may include additional controller circuitry in the form of application specific integrated circuits (ASICs), processors, and/or discrete integrated circuits and components for performing communication and electrical control activities associated with the respective devices. Additionally, the menu processing module 220 may also include interrupt-level, stack-level, and application-level modules as appropriate. Furthermore, the menu processing module 220 may include any memory components used for storage, execution, and data processing for performing processing activities associated with the module.

It should also be noted that the menu processing module 220 may form a portion of other circuitry described without departure from the scope of the present subject matter. Further, the menu processing module 220 may alternatively be implemented as an application stored within the memory 212. In such an implementation, the menu processing module 220 may include instructions executed by the processor 202 for performing the functionality described herein. The processor 202 may execute these instructions to provide the processing capabilities described above and in more detail below for the core processing module 200. The menu processing module 220 may form a portion of an interrupt service routine (ISR), a portion of an operating system, a portion of a browser application, or a portion of a separate application without departure from the scope of the present subject matter.

The processor 202, the display device 204, the input device 206, the audio output device 208, the communication device 210, the memory 212, and the menu processing module 220 are interconnected via one or more interconnections shown as interconnection 222 for ease of illustration. The interconnection 222 may include a system bus, a network, or any other interconnection capable of providing the respective components with suitable interconnection for the respective purpose.

Furthermore, components within the core processing module 200 may be co-located or distributed within a network without departure from the scope of the present subject matter. For example, the components within the core processing module 200 may be located within a stand-alone device, such as a personal computer (e.g., desktop or laptop) or handheld device (e.g., cellular telephone, personal digital assistant (PDA), email device, music recording or playback device, etc.). For a distributed arrangement, the display device 204 and the input device 206 may be located at a kiosk, while the processor 202 and memory 212 may be located at a local or remote server. Many other possible arrangements for the components of the core processing module 200 are possible and all are considered within the scope of the present subject matter.

Figure 3:
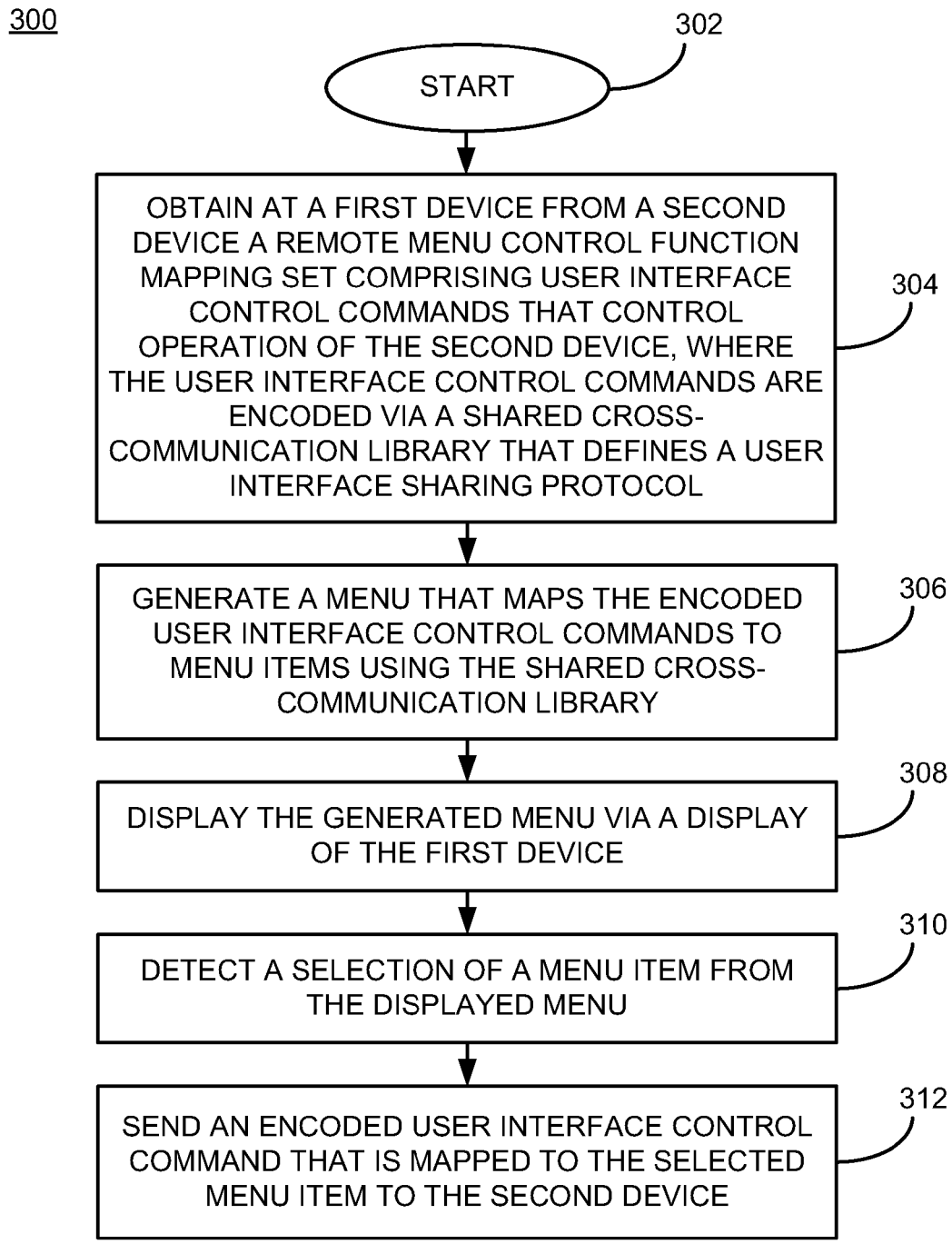
FIG. 3 is a flow chart of an example of an implementation of a process that provides automated smart-remote protocol processing consistent with certain embodiments of the present invention.

FIG. 3 is a flow chart of an example of an implementation of a process 300 that provides automated smart-remote protocol processing. The process 300 starts at 302. At block 304, the process 300 obtains at a first device from a second device a remote menu control function mapping set comprising user interface control commands that control operation of the second device, where the user interface control commands are encoded via a shared cross-communication library that defines a user interface sharing protocol. At block 306, the process 300 generates a menu that maps the encoded user interface control commands to menu items using the shared cross-communication library. At block 308, the process 300 displays the generated menu via a display of the first device. At block 310, the process 300 detects a selection of a menu item from the displayed menu. At block 312, the process 300 sends an encoded user interface control command that is mapped to the selected menu item to the second device.

Figure 4A:
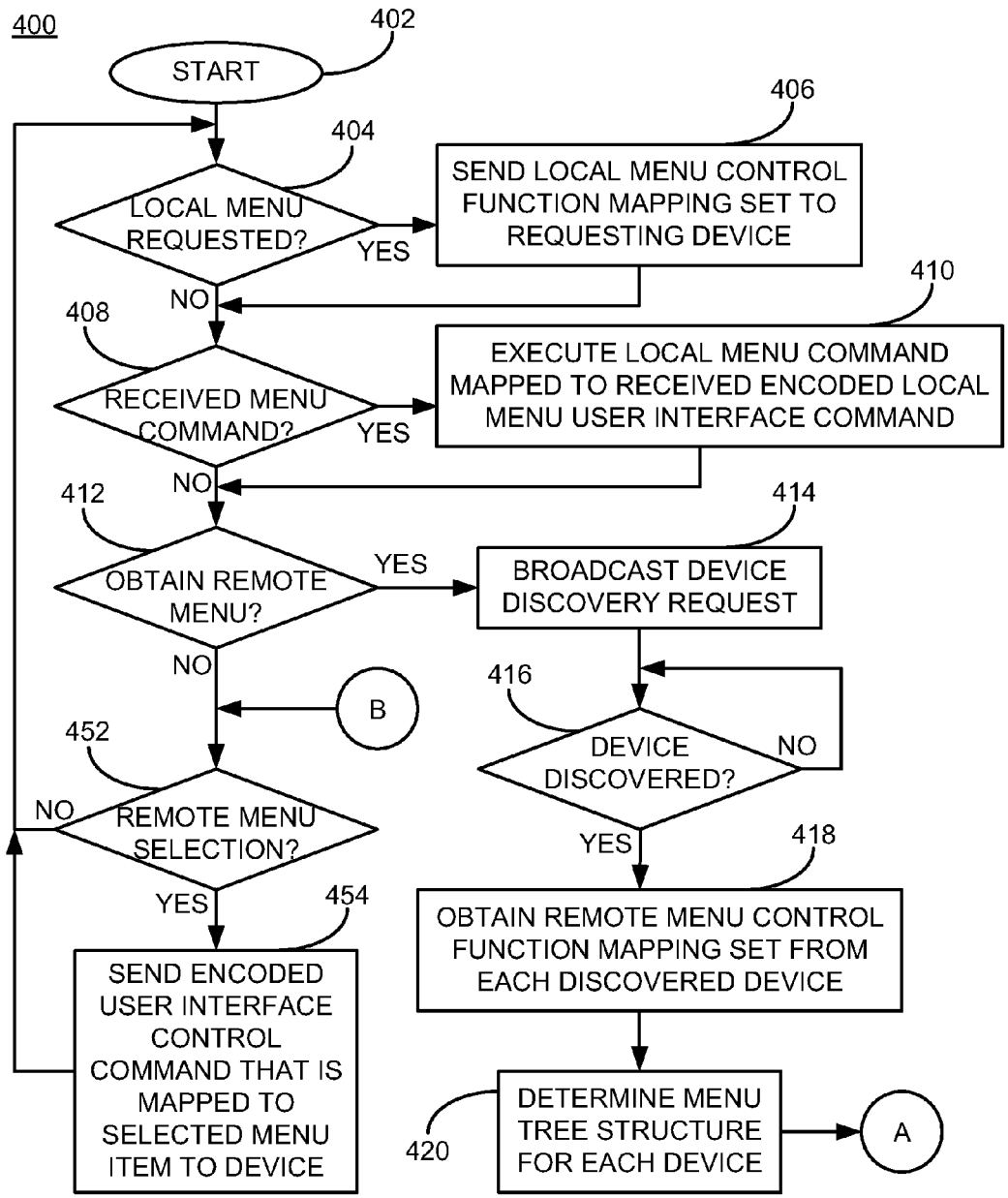
FIG. 4A is a flow chart of an example of an implementation of initial processing within a process for automated smart-remote protocol processing consistent with certain embodiments of the present invention.
Figure 4B:
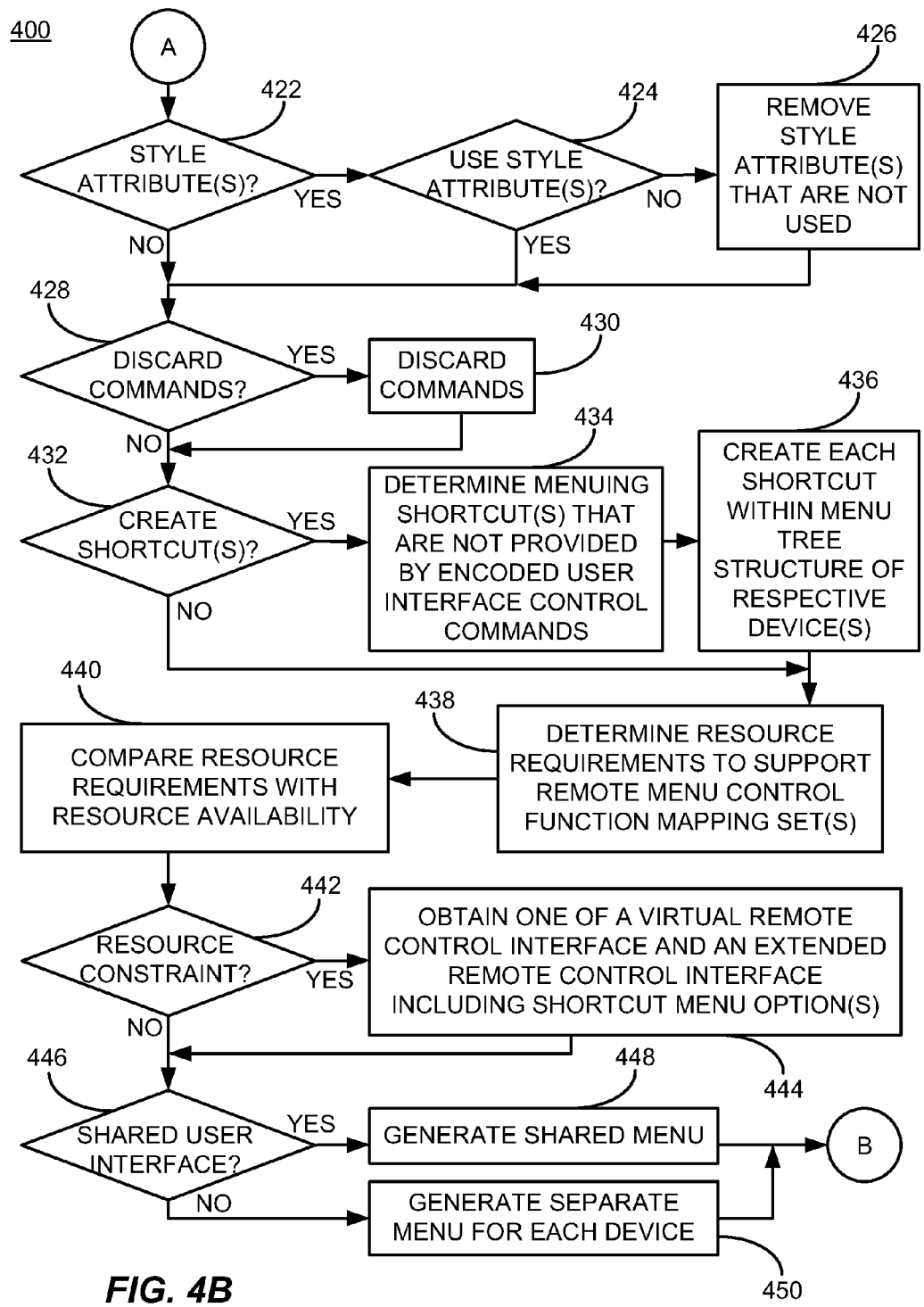
FIG. 4B is a flow chart of an example of an implementation of additional processing within a process for automated smart-remote protocol processing consistent with certain embodiments of the present invention.

FIGS. 4A-4B illustrate a flow chart of an example of an implementation of process 400 for automated smart-remote protocol processing. It should be noted that the process 400 may be implemented by any device, such as the devices of the system 100, for cross-control functionality implementation. FIG. 4A illustrates initial processing within the process 400. The process 400 starts at 402. At decision point 404, the process 400 begins iterative higher-level processing by determining whether a request has been received from another device for a local menu control function mapping set of the device implementing the process 400. It should be noted that the local menu control function mapping set includes user interface control commands that control operation of the device that implements the process 400 encoded via a shared cross-communication library that defines a user interface sharing protocol, as described above. In response to a determination at decision point 404 that a request has been received for a local menu control function mapping set, the process 400 sends the local menu control function mapping set to the requesting device at block 406.

In response to sending the local menu control function mapping set to the requesting device at block 406, or in response to determining that a local menu request has not been detected at decision point 404, the process 400 makes a determination at decision point 408 as to whether an encoded local menu user interface control command of the local menu control function mapping set has been received. In response to determining that an encoded local menu user interface control command has been received, the process 400 executes a local menu command that is mapped to the received encoded local menu user interface control command at block 410. In response to executing the local menu command that is mapped to the received encoded local menu user interface command at block 410, or in response to determining that an encoded local menu user interface control command has not been received at decision point 408, the process 400 makes a determination at decision point 412 as to whether to obtain one or more remote menu control function mapping sets from one or more other devices.

In response to determining at decision point 412 to obtain one or more remote menu control function mapping sets, the process 400 broadcasts a device discovery request at block 414. The broadcasted device discovery request may be transmitted via one or more communication protocols available on the broadcasting device. Additionally, as described above, the process 400 may send a probe command to one or more devices to initiate device discovery.

In response to broadcasting a device discovery request at block 414, or in response to determining at decision point 412 not to obtain one or more remote menu control function mapping sets, the process 400 makes a determination at decision point 416 as to whether one or more devices have been discovered. For purposes of the present example, it is assumed that at least one device is discovered. Discovery of a device may include, for example, receiving a service identifier (ID) in response to a probe command transmitted by the respective device. At block 418, the process 400 obtains a remote menu control function mapping set from each discovered device. Obtaining the remote menu control function mapping set may include requesting the remote menu control function mapping set from each discovered device using a service ID received from each discovered device. It should be additionally noted that obtaining the remote menu control function mapping set from each discovered device may include communicating, via a first communication protocol, a request to an intermediate (e.g., third) device to obtain a remote menu control function mapping set from a device via the intermediate device using a communication protocol that is unavailable on the requesting device. In such an implementation, the remote menu control function mapping set may be obtained from the intermediate device in response to the request. It should additionally be noted that the obtained remote menu control function mapping set may include an extensible markup language (XML) formatted menu structure or other menu control function mapping set format as appropriate for a given implementation.

At block 420, the process 400 determines a menu tree structure for menu and control functions of each encoded user interface control command for each discovered device. Each control function associated with each device may include a control function identifier (ID) and a selectable value for a range of selectable values associated with each control function ID. The process 400 transitions to the processing shown and described in association with FIG. 4B.

FIG. 4B illustrates additional processing associated with the process 400 for automated smart-remote protocol processing. At decision point 422, the process 400 makes a determination as to whether the obtained remote menu control function mapping set of any discovered device includes additional information, such as for example, one or more menu style attributes used by the respective discovered device during menu display. Menu style attributes may be encoded as metadata within the obtained remote menu control function mapping sets. This metadata may further include information regarding layout of user interface controls for user interface of the respective discovered devices. In response to determining that the obtained remote menu control function mapping set includes additional information identifying at least one menu style attribute, the process 400 makes a determination at decision point 424 as to whether to use one or more menu style attribute(s) to generate a menu for control of the respective discovered devices. In response to determining not to use one or more style attributes, the process 400 removes any style attributes that are not used at block 426. In response to removing any unused file attributes, or in response to determining to use one or more available menu style attributes at decision point 424, the process 400 makes a determination at decision point 428 as to whether to discard any of the encoded user interface control commands for a generated menu for each respective discovered device. As such, the process 400 may make a determination as to whether to use fewer than all of the received encoded user interface control commands. In response to determining to discard at least one command, the process 400 discards any encoded user interface control commands that are not to be used for generating the respective menu at block 430.

In response to discarding any encoded user interface control commands at block 430, or in response to determining not to discard at least one command at decision point 428, the process 400 makes a determination at decision point 432 as to whether to create any menuing shortcuts that are not provided by the encoded user interface control commands. In response to determining to create one or more menuing shortcuts, the process 400 determines menuing shortcuts that are not provided by the encoded user interface control commands of the respective discovered devices for use in generating a menu for the respective devices at block 434. At block 436, the process 400 creates each menu shortcut within a menu tree structure of the respective discovered devices. For example, the process 400 may assign a specific keystroke for each menuing shortcut. Alternatively, the process 400 may add a new menu item for a menu to be generated for each menuing shortcut.

In response to creating each menu shortcut at block 436, or in response to determining not to create any menuing shortcuts at decision point 432, the process 400 determines resource requirements to support the remote menu control function mapping set of each discovered device at block 438. At block 440, the process 400 compares the resource requirements with resource availability of the device operating the process 400. At decision point 442, the process 400 makes a determination as to whether at least one resource constraint limits use of all features of one or more remote menu control function mapping sets. In response to determining that at least one resource constraint exists that limits use of all features of any of the received remote menu control function mapping sets, the process 400 obtains one of a virtual remote control interface and an extended remote control interface that includes menu options from any respective discovered device for which a resource constraint has been determined at block 444.

In response to obtaining one of a virtual remote control interface and an extended remote control interface from any respective device at block 444, or in response to determining that no resource constraint exists at decision point 442, the process 400 makes a determination at decision point 446 as to whether to generate a shared user interface (e.g., a shared menu) for all discovered devices or whether to generate separate menus for each discovered device. In response to determining to generate a shared user interface, the process 400 generates a shared menu for all discovered devices at block 448. In response to determining not to generate a shared user interface for at least one discovered device, the process 400 generates a separate menu for each such device at block 450.

It should be noted, however, that a shared menu may be generated for certain discovered devices and that separate menus may be generated for one or more devices in conjunction with generation of a shared menu without departure from the scope of the present subject matter. It should further be noted that the respective generated menus may be generated using style attributes as described above. Additionally, menus may be generated with or without discarding encoded user interface control commands as also described above. Menus may further be generated using determined menuing shortcuts that are not provided by the encoded user interface control commands of one or more discovered devices as also described above. Additionally, menus may be generated using virtual remote control interfaces or extended remote control interfaces in response to determined resource constraints. Menus may be generated as described above using a shared cross-communication library that allows each device to cross-control one another via the smart-remote protocol described herein. It is further understood that the generated menu(s) may be displayed immediately or stored and displayed later, as appropriate for a given implementation. For purposes of the present example, it is assumed at least one generated menu is displayed. Many other possibilities exist for menu generation, and all are considered within the scope of the present subject matter.

The process 400 then transitions back to the processing shown and described in association with FIG. 4A. As such, in response to generating the respective menu(s) as described above in association with FIG. 4B, or in response to determining at decision point 412 not to obtain remote menu control function mapping sets, the process 400 makes a determination as to whether a selection of a menu item has been detected at decision point 452. In response to determining at decision point 452 that a selection of a menu item from the displayed menu has been detected, the process 400 sends an encoded user interface control command that is mapped to the selected menu item to the respective device associated with the displayed menu at block 454. It should further be understood that, where a shared menu has been created for a group of devices or where a common menu has been created and one or more devices is configured via the common menu to be concurrently controlled, the process 400 may send the encoded user interface control command that is mapped to the selected menu item to each of a group of discovered devices.

For example, as described above, for a group of devices within a retail or other environment that are to be controlled, an encoded user interface control command that is mapped to the selected menu item for each of the group of devices may be sent to the respective device. Further, as described above, the devices may be manufactured by different manufacturers and may include different models without departure from the scope of the present subject matter. In such an implementation, the respective encoded user interface control command (that may be different for every controlled device) received within the respective menu control function mapping set of the respective device may be sent to the specific device to implement a common control of each of the group of devices. It should additionally be noted that where the respective command includes a control function ID and a selected value, whether a discreet value or a value selected from a range of selectable values, the control function ID and the selected value may also be sent to the respective device(s). In response to sending the encoded user interface control command to the respective device(s) along with any associated control function ID and selected value at block 454, or in response to determining at decision point 452 that a remote menu selection has not been detected, the process 400 returns to decision point 404 and iterates as described above. As such, decision point 404, decision point 408, decision point 412, and decision point 452 define a higher-level of iterative processing within the process 400.

As such, the process 400 processes requests from other devices for a local menu control function mapping set and obtains remote menu control function mapping sets from other devices. The process 400 generates individual or shared/common menus for devices to be controlled. The menu(s) may be configured based upon style attributes received as metadata with remote menu control function mapping sets. The menus may be generated with certain menu items discarded and additional menu selections and shortcut keys may be created that are not available at the respective device to be controlled. Resource requirements for menu operation may be considered and virtual or extended remote control interfaces, including additional menu shortcut options may be utilized to control one or more devices. Accordingly, the process 400 implements one example of the smart-remote protocol described herein.

Thus, in accord with certain implementations, a method of controlling devices with different user interface control protocols involves broadcasting a probe command from a first device; receiving a service identifier (ID) from a second device in response to the probe command; obtaining, using the service ID at a first device from a second device, a remote menu control function mapping set including user interface control commands that control operation of the second device formatted as an extensible markup language (XML) formatted menu structure and including metadata identifying at least one menu style attribute used by the second device during menu display, where the user interface control commands are encoded via a shared cross-communication library that defines a user interface sharing protocol; determining a menu tree structure for menu and control functions of each encoded user interface control command, where each control function includes a control function identifier (ID) and a range of selectable values; determining at least one menuing shortcut that is not provided by the encoded user interface control commands; determining whether to use the at least one menu style attribute to generate a menu; generating the menu that maps the encoded user interface control commands to menu items using the shared cross-communication library based upon the determined menu tree structure, the determined at least one menuing shortcut that is not provided by the encoded user interface control commands, and using the at least one menu style attribute in response to determining to use the at least one menu style attribute to generate the menu, where each node of the menu tree structure is mapped to one of the control functions using the control function ID; encoding the range of selectable values for each node into the menu tree structure; displaying the generated menu via a display of the first device; detecting a selection of a menu item from the displayed menu including a selection of a value from the range of selectable values; and sending an encoded user interface control command that is mapped to the selected menu item including the control function ID and the selected value to the second device.

In certain implementations, the method of controlling devices with different user interface control protocols involves obtaining at a first device from a second device a remote menu control function mapping set including user interface control commands that control operation of the second device, where the user interface control commands are encoded via a shared cross-communication library that defines a user interface sharing protocol; generating a menu that maps the encoded user interface control commands to menu items using the shared cross-communication library; displaying the generated menu via a display of the first device; detecting a selection of a menu item from the displayed menu; and sending an encoded user interface control command that is mapped to the selected menu item to the second device.

In certain implementations, the method of controlling devices with different user interface control protocols further involves receiving a request at the first device from a third device for a local menu control function mapping set of the first device including user interface control commands that control operation of the first device encoded via the shared cross-communication library that defines the user interface sharing protocol; sending the local menu control function mapping set of the first device to the third device; receiving an encoded local menu user interface control command of the local menu control function mapping set from the third device; and executing a local menu command that is mapped to the received encoded local menu user interface control command. In certain implementations, the method of obtaining at the first device from the second device the remote menu control function mapping set including the user interface control commands that control operation of the second device involves broadcasting a device discovery request via at least one communication protocol available on the first device; discovering the second device via the at least one communication protocol available on the first device; and requesting the remote menu control function mapping set from the second device. In certain implementations, discovering the second device via the at least one communication protocol available on the first device includes discovering the second device as one of a plurality of discovered devices accessible via the at least one communication protocol available on the first device, and the method of obtaining at the first device from the second device the remote menu control function mapping set including the user interface control commands that control operation of the second device involves obtaining one of a plurality of remote menu control function mapping sets from each of the plurality of discovered devices; generating the menu that maps the encoded user interface control commands to the menu items using the shared cross-communication library includes generating the menu that maps encoded user interface control commands of each of the plurality of remote menu control function mapping sets to the menu items using the shared cross-communication library; and sending the encoded user interface control command that is mapped to the selected menu item to the second device includes sending the encoded user interface control command that is mapped to the selected menu item to each of the plurality of discovered devices. In certain implementations, the method of generating the menu that maps the encoded user interface control commands to the menu items using the shared cross-communication library involves determining to use fewer than all of the encoded user interface control commands for the generated menu; discarding at least one of the encoded user interface control commands; and generating the menu without the discarded at least one of the encoded user interface control commands. In certain implementations, the method of generating the menu that maps the encoded user interface control commands to the menu items using the shared cross-communication library involves determining at least one menuing shortcut that is not provided by the encoded user interface control commands; and generating the menu using the determined at least one menuing shortcut that is not provided by the encoded user interface control commands. In certain implementations, the obtained remote menu control function mapping set includes additional information identifying at least one menu style attribute used by the second device during menu display, and the method of generating the menu that maps the encoded user interface control commands to the menu items using the shared cross-communication library involves determining whether to use the at least one menu style attribute to generate the menu; and generating the menu using the at least one menu style attribute in response to determining to use the at least one menu style attribute to generate the menu. In certain implementations, the at least one menu style attribute is encoded as metadata within the obtained remote menu control function mapping set, and the metadata includes information regarding layout of user interface controls for a user interface of the second device. In certain implementations, the method further involves determining resource requirements to support the remote menu control function mapping set of the second device; comparing the resource requirements with resource availability of the first device to support the remote menu control function mapping set of the second device; determining that at least one resource constraint exists that limits use of all features of the remote menu control function mapping set; obtaining one of a virtual remote control interface that maps to a remote control device associated with the second device to menu commands and an extended remote control interface including at least one shortcut menu option; and the method of generating the menu that maps the encoded user interface control commands to the menu items using the shared cross-communication library involves generating the menu including the one of the virtual remote control interface and the extended remote control interface.

In another implementation, a computer readable storage medium may store instructions which, when executed on one or more programmed processors, carry out a process of controlling devices with different user interface control protocols involving obtaining at a first device from a second device a remote menu control function mapping set including user interface control commands that control operation of the second device, where the user interface control commands are encoded via a shared cross-communication library that defines a user interface sharing protocol; generating a menu that maps the encoded user interface control commands to menu items using the shared cross-communication library; displaying the generated menu via a display of the first device; detecting a selection of a menu item from the displayed menu; and sending an encoded user interface control command that is mapped to the selected menu item to the second device.

An apparatus for controlling devices with different user interface control protocols, consistent with certain implementations, has a display and a processor programmed to obtain from a second device a remote menu control function mapping set including user interface control commands that control operation of the second device, where the user interface control commands are encoded via a shared cross-communication library that defines a user interface sharing protocol; generate a menu that maps the encoded user interface control commands to menu items using the shared cross-communication library; display the generated menu via the display; detect a selection of a menu item from the displayed menu; and send an encoded user interface control command that is mapped to the selected menu item to the second device.

In certain implementations, the processor is further programmed to receive a request from a third device for a local menu control function mapping set including user interface control commands that control operation encoded via the shared cross-communication library that defines the user interface sharing protocol; send the local menu control function mapping set to the third device; receive an encoded local menu user interface control command of the local menu control function mapping set from the third device; and execute a local menu command that is mapped to the received encoded local menu user interface control command. In certain implementations, in being programmed to obtain from the second device the remote menu control function mapping set including the user interface control commands that control operation of the second device, the processor is programmed to broadcast a device discovery request via at least one communication protocol; discover the second device via the at least one communication protocol; and request the remote menu control function mapping set from the second device. In certain implementations, in being programmed to discover the second device via the at least one communication protocol, the processor is programmed to discover the second device as one of a plurality of discovered devices accessible via the at least one communication protocol; in being programmed to obtain from the second device the remote menu control function mapping set including the user interface control commands that control operation of the second device, the processor is programmed to obtain one of a plurality of remote menu control function mapping sets from each of the plurality of discovered devices; in being programmed to generate the menu that maps the encoded user interface control commands to the menu items using the shared cross-communication library, the processor is programmed to generate the menu that maps encoded user interface control commands of each of the plurality of remote menu control function mapping sets to the menu items using the shared cross-communication library; and in being programmed to send the encoded user interface control command that is mapped to the selected menu item to the second device, the processor is programmed to send the encoded user interface control command that is mapped to the selected menu item to each of the plurality of discovered devices. In certain implementations, in being programmed to generate the menu that maps the encoded user interface control commands to the menu items using the shared cross-communication library, the processor is programmed to determine to use fewer than all of the encoded user interface control commands for the generated menu; discard at least one of the encoded user interface control commands; and generate the menu without the discarded at least one of the encoded user interface control commands. In certain implementations, in being programmed to generate the menu that maps the encoded user interface control commands to the menu items using the shared cross-communication library, the processor is programmed to determine at least one menuing shortcut that is not provided by the encoded user interface control commands; and generate the menu using the determined at least one menuing shortcut that is not provided by the encoded user interface control commands. In certain implementations, the obtained remote menu control function mapping set includes additional information identifying at least one menu style attribute used by the second device during menu display; and, in being programmed to generate the menu that maps the encoded user interface control commands to the menu items using the shared cross-communication library, the processor is programmed to determine whether to use the at least one menu style attribute to generate the menu; and generate the menu using the at least one menu style attribute in response to determining to use the at least one menu style attribute to generate the menu. In certain implementations, the at least one menu style attribute is encoded as metadata within the obtained remote menu control function mapping set and the metadata includes information regarding layout of user interface controls for a user interface of the second device. In certain implementations, the processor is further programmed to determine resource requirements to support the remote menu control function mapping set of the second device; compare the resource requirements with resource availability to support the remote menu control function mapping set of the second device; determine that at least one resource constraint exists that limits use of all features of the remote menu control function mapping set; obtain one of a virtual remote control interface that maps to a remote control device associated with the second device to menu commands and an extended remote control interface including at least one shortcut menu option; and, in being programmed to generate the menu that maps the encoded user interface control commands to the menu items using the shared cross-communication library, the processor is programmed to generate the menu including the one of the virtual remote control interface and the extended remote control interface.

While certain embodiments herein were described in conjunction with specific circuitry that carries out the functions described, other embodiments are contemplated in which the circuit functions are carried out using equivalent elements executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware, dedicated processors or combinations thereof.

Certain embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of controlling devices with different user interface control protocols, comprising:
broadcasting a probe command from a first device;
receiving a service identifier (ID) from a second device in response to the probe command;
obtaining, using the service ID at a first device from a second device, a remote menu control function mapping set comprising user interface control commands that control operation of the second device formatted as an extensible markup language (XML) formatted menu structure and comprising metadata identifying at least one menu style attribute used by the second device during menu display, where the user interface control commands are encoded via a shared cross-communication library that defines a user interface sharing protocol;
determining a menu tree structure for menu and control functions of each encoded user interface control command, where each control function comprises a control function identifier (ID) and a range of selectable values;
determining at least one menu shortcut that is not provided by the encoded user interface control commands;
determining whether to use the at least one menu style attribute to generate a menu;
generating the menu that maps the encoded user interface control commands to menu items using the shared cross-communication library based upon the determined menu tree structure, the determined at least one menu shortcut that is not provided by the encoded user interface control commands, and using the at least one menu style attribute in response to determining to use the at least one menu style attribute to generate the menu, where each node of the menu tree structure is mapped to one of the control functions using the control function ID;
encoding the range of selectable values for each node into the menu tree structure;
displaying the generated menu via a display of the first device;
detecting a selection of a menu item from the displayed menu comprising a selection of a value from the range of selectable values; and
sending an encoded user interface control command that is mapped to the selected menu item comprising the control function ID and the selected value to the second device.

2. A method of controlling devices with different user interface control protocols, comprising:
obtaining at a first device from a second device a remote menu control function mapping set comprising user interface control commands that control operation of the second device, where the user interface control commands are encoded via a shared cross-communication library that defines a user interface sharing protocol;
generating a menu that maps the encoded user interface control commands to menu items using the shared cross-communication library;
displaying the generated menu via a display of the first device;
detecting a selection of a menu item from the displayed menu;
sending an encoded user interface control command that is mapped to the selected menu item to the second device;
determining resource requirements to support the remote menu control function mapping set of the second device;
comparing the resource requirements with resource availability of the first device to support the remote menu control function mapping set of the second device;
determining that at least one resource constraint exists that limits use of all features of the remote menu control function mapping set;
obtaining one of a virtual remote control interface that maps to a remote control device associated with the second device to menu commands and an extended remote control interface comprising at least one shortcut menu option; and
where generating the menu that maps the encoded user interface control commands to the menu items using the shared cross-communication library comprises generating the menu comprising the one of the virtual remote control interface and the extended remote control interface.

3. The method according to claim 2, further comprising:
receiving a request at the first device from a third device for a local menu control function mapping set of the first device comprising user interface control commands that control operation of the first device encoded via the shared cross-communication library that defines the user interface sharing protocol;
sending the local menu control function mapping set of the first device to the third device;
receiving an encoded local menu user interface control command of the local menu control function mapping set from the third device; and
executing a local menu command that is mapped to the received encoded local menu user interface control command.

4. The method according to claim 2, where obtaining at the first device from the second device the remote menu control function mapping set comprising the user interface control commands that control operation of the second device comprises:
broadcasting a device discovery request via at least one communication protocol available on the first device;
discovering the second device via the at least one communication protocol available on the first device; and
requesting the remote menu control function mapping set from the second device.

5. The method according to claim 4, where:
discovering the second device via the at least one communication protocol available on the first device comprises discovering the second device as one of a plurality of discovered devices accessible via the at least one communication protocol available on the first device;
obtaining at the first device from the second device the remote menu control function mapping set comprising the user interface control commands that control operation of the second device comprises obtaining one of a plurality of remote menu control function mapping sets from each of the plurality of discovered devices;
generating the menu that maps the encoded user interface control commands to the menu items using the shared cross-communication library comprises generating the menu that maps encoded user interface control commands of each of the plurality of remote menu control function mapping sets to the menu items using the shared cross-communication library; and
sending the encoded user interface control command that is mapped to the selected menu item to the second device comprises sending the encoded user interface control command that is mapped to the selected menu item to each of the plurality of discovered devices.

6. The method according to claim 2, where generating the menu that maps the encoded user interface control commands to the menu items using the shared cross-communication library comprises:
   determining to use fewer than all of the encoded user interface control commands for the generated menu;
   discarding at least one of the encoded user interface control commands; and
   generating the menu without the discarded at least one of the encoded user interface control commands.

7. The method according to claim 2, where generating the menu that maps the encoded user interface control commands to the menu items using the shared cross-communication library comprises:
   determining at least one menu shortcut that is not provided by the encoded user interface control commands; and
   generating the menu using the determined at least one menu shortcut that is not provided by the encoded user interface control commands.

8. The method according to claim 2, where the obtained remote menu control function mapping set comprises additional information identifying at least one menu style attribute used by the second device during menu display; and
   where generating the menu that maps the encoded user interface control commands to the menu items using the shared cross-communication library comprises:
      determining whether to use the at least one menu style attribute to generate the menu; and
      generating the menu using the at least one menu style attribute in response to determining to use the at least one menu style attribute to generate the menu.

9. The method according to claim 8, where the at least one menu style attribute is encoded as metadata within the obtained remote menu control function mapping set and where the metadata comprises information regarding layout of user interface controls for a user interface of the second device.

10. A non-transitory computer readable storage medium storing instructions which, when executed on one or more programmed processors, carry out a method of controlling devices with different user interface control protocols, comprising:
    obtaining at a first device from a second device a remote menu control function mapping set comprising user interface control commands that control operation of the second device, where the user interface control commands are encoded via a shared cross-communication library that defines a user interface sharing protocol;
    generating a menu that maps the encoded user interface control commands to menu items using the shared cross-communication library;
    displaying the generated menu via a display of the first device;
    detecting a selection of a menu item from the displayed menu;
    sending an encoded user interface control command that is mapped to the selected menu item to the second device.;
    determining resource requirements to support the remote menu control function mapping set of the second device;
    comparing the resource requirements with resource availability of the first device to support the remote menu control function mapping set of the second device;
    determining that at least one resource constraint exists that limits use of all features of the remote menu control function mapping set;
    obtaining one of a virtual remote control interface that maps to a remote control device associated with the second device to menu commands and an extended remote control interface comprising at least one shortcut menu option; and
    where generating the menu that maps the encoded user interface control commands to the menu items using the shared cross-communication library comprises generating the menu comprising the one of the virtual remote control interface and the extended remote control interface.

11. An apparatus for controlling devices with different user interface control protocols, comprising:
    a display; and
    a processor programmed to:
       obtain from a second device a remote menu control function mapping set comprising user interface control commands that control operation of the second device, where the user interface control commands are encoded via a shared cross-communication library that defines a user interface sharing protocol;
       generate a menu that maps the encoded user interface control commands to menu items using the shared cross-communication library;
       display the generated menu via the display;
       detect a selection of a menu item from the displayed menu;
    send an encoded user interface control command that is mapped to the selected menu item to the second device
    determine resource requirements to support the remote menu control function mapping set of the second device;
    compare the resource requirements with resource availability to support the remote menu control function mapping set of the second device;
    determine that at least one resource constraint exists that limits use of all features of the remote menu control function mapping set;
    obtain one of a virtual remote control interface that maps to a remote control device associated with the second device to menu commands and an extended remote control interface comprising at least one shortcut menu option; and
       where, in being programmed to generate the menu that maps the encoded user interface control commands to the menu items using the shared cross-communication library, the processor is programmed to generate the menu comprising the one of the virtual remote control interface and the extended remote control interface.

12. The apparatus according to claim 11, where the processor is further programmed to:
    receive a request from a third device for a local menu control function mapping set comprising user interface control commands that control operation encoded via the shared cross-communication library that defines the user interface sharing protocol;
    send the local menu control function mapping set to the third device;
    receive an encoded local menu user interface control command of the local menu control function mapping set from the third device; and
    execute a local menu command that is mapped to the received encoded local menu user interface control command.

13. The apparatus according to claim 11, where, in being programmed to obtain from the second device the remote menu control function mapping set comprising the user interface control commands that control operation of the second device, the processor is programmed to:

broadcast a device discovery request via at least one communication protocol;

discover the second device via the at least one communication protocol; and request the remote menu control function mapping set from the second device.

14. The apparatus according to claim 13, where, in being programmed to:

discover the second device via the at least one communication protocol, the processor is programmed to discover the second device as one of a plurality of discovered devices accessible via the at least one communication protocol;

obtain from the second device the remote menu control function mapping set comprising the user interface control commands that control operation of the second device, the processor is programmed to obtain one of a plurality of remote menu control function mapping sets from each of the plurality of discovered devices;

generate the menu that maps the encoded user interface control commands to the menu items using the shared cross-communication library, the processor is programmed to generate the menu that maps encoded user interface control commands of each of the plurality of remote menu control function mapping sets to the menu items using the shared cross-communication library; and send the encoded user interface control command that is mapped to the selected menu item to the second device, the processor is programmed to send the encoded user interface control command that is mapped to the selected menu item to each of the plurality of discovered devices.

15. The apparatus according to claim 11, where, in being programmed to generate the menu that maps the encoded user interface control commands to the menu items using the shared cross-communication library, the processor is programmed to:

determine to use fewer than all of the encoded user interface control commands for the generated menu;

discard at least one of the encoded user interface control commands; and generate the menu without the discarded at least one of the encoded user interface control commands.

16. The apparatus according to claim 11, where, in being programmed to generate the menu that maps the encoded user interface control commands to the menu items using the shared cross-communication library, the processor is programmed to:

determine at least one menu shortcut that is not provided by the encoded user interface control commands; and generate the menu using the determined at least one menu shortcut that is not provided by the encoded user interface control commands.

17. The apparatus according to claim 11, where the obtained remote menu control function mapping set comprises additional information identifying at least one menu style attribute used by the second device during menu display; and where, in being programmed to generate the menu that maps the encoded user interface control commands to the menu items using the shared cross-communication library, the processor is programmed to:

determine whether to use the at least one menu style attribute to generate the menu; and generate the menu using the at least one menu style attribute in response to determining to use the at least one menu style attribute to generate the menu.

18. The apparatus according to claim 17, where the at least one menu style attribute is encoded as metadata within the obtained remote menu control function mapping set and where the metadata comprises information regarding layout of user interface controls for a user interface of the second device.

\* \* \* \* \*